(12) United States Patent
Howard et al.

(10) Patent No.: US 7,908,040 B2
(45) Date of Patent: Mar. 15, 2011

(54) SYSTEM AND METHOD FOR AUTOMATED SEARCH BY DISTRIBUTED ELEMENTS

(75) Inventors: Michael D. Howard, Westlake Village, CA (US); David Payton, Calabasas, CA (US); Wendell Bradshaw, Fredericksburg, VA (US); Timothy Smith, Arlington, VA (US)

(73) Assignee: Raytheon Company, Waltham, MA (US)

( * ) Notice: Subject to any disclaimer, the term of this patent is extended or adjusted under 35 U.S.C. 154(b) by 1435 days.

(21) Appl. No.: 10/892,747

(22) Filed: Jul. 15, 2004

(65) Prior Publication Data

US 2006/0015215 A1      Jan. 19, 2006

(51) Int. Cl.
    *G05D 1/00*         (2006.01)
(52) U.S. Cl. ......... 701/1; 701/2; 701/3; 701/23; 701/24; 701/27; 701/28
(58) Field of Classification Search ............... 701/3, 207; 703/6; 382/159, 228; 318/568.12, 568.16; 702/19; 700/245, 247, 248
See application file for complete search history.

(56) References Cited

U.S. PATENT DOCUMENTS

| | | | |
|---|---|---|---|
| 4,763,276 A * | 8/1988 | Perreirra et al. | 700/262 |
| 5,285,380 A | 2/1994 | Payton | |
| 5,323,470 A | 6/1994 | Kara et al. | |
| 5,387,993 A * | 2/1995 | Heller et al. | 398/151 |
| 5,801,970 A * | 9/1998 | Rowland et al. | 703/6 |
| 5,940,816 A | 8/1999 | Fuhrer et al. | |
| 6,151,582 A | 11/2000 | Huang et al. | |
| 6,415,274 B1 | 7/2002 | Goldsmith | |
| 6,445,308 B1 * | 9/2002 | Koike | 340/902 |
| 6,507,771 B2 * | 1/2003 | Payton et al. | 700/245 |
| 6,580,979 B2 * | 6/2003 | Payton et al. | 701/25 |
| 6,640,145 B2 * | 10/2003 | Hoffberg et al. | 700/83 |
| 6,687,606 B1 | 2/2004 | Moitra et al. | |
| 6,751,661 B1 | 6/2004 | Geddes | |
| 6,799,087 B2 * | 9/2004 | Estkowski | 700/245 |
| 6,910,657 B2 * | 6/2005 | Schneider | 244/3.11 |
| 6,952,646 B2 * | 10/2005 | Chang | 701/207 |
| 7,085,694 B2 * | 8/2006 | Xavier et al. | 703/7 |
| 7,305,467 B2 * | 12/2007 | Kaiser et al. | 709/224 |
| 2002/0022909 A1 * | 2/2002 | Karem | 701/3 |

(Continued)

FOREIGN PATENT DOCUMENTS

JP           05297947           12/1993

(Continued)

OTHER PUBLICATIONS

PCT/US2005/025332 International Search Report dated Nov. 7, 2005.

(Continued)

*Primary Examiner* — Khoi Tran
*Assistant Examiner* — Bhavesh V Amin
(74) *Attorney, Agent, or Firm* — Daly, Crowley, Mofford & Durkee, LLP (57) ABSTRACT

A system and method for decentralized cooperative control of a team of agents for geographic and other search tasks. The approach is behavior-based and uses probability particle approach to the search problem. Agents are attracted to probability distributions in the form of virtual particles of probability that represent hypotheses about the existence of objects of interest in a geographic area or a data-space. Reliance on dependable, high-bandwidth communication is reduced by modeling the movements of other team members and the objects of interest between periodic update messages.

40 Claims, 7 Drawing Sheets

U.S. PATENT DOCUMENTS

| | | | |
|---|---|---|---|
| 2002/0138247 A1* | 9/2002 | Payton et al. ................. | 703/22 |
| 2003/0100998 A2* | 5/2003 | Brunner et al. ................ | 702/19 |
| 2003/0163334 A1 | 8/2003 | Pachon et al. | |
| 2004/0006424 A1* | 1/2004 | Joyce et al. ................... | 701/207 |
| 2004/0128645 A1 | 7/2004 | Srivastava | |
| 2004/0230372 A1* | 11/2004 | Chang ........................... | 701/207 |
| 2004/0249504 A1* | 12/2004 | Gutmann et al. ............. | 700/245 |
| 2006/0015215 A1* | 1/2006 | Howard et al. ............... | 700/245 |
| 2006/0161405 A1* | 7/2006 | Munirajan ..................... | 703/6 |
| 2007/0250260 A1* | 10/2007 | Ariyur et al. ................. | 701/207 |

FOREIGN PATENT DOCUMENTS

| | | |
|---|---|---|
| WO | WO 03/096054 A2 | 11/2003 |
| WO | WO 2004/003680 A2 | 1/2004 |
| WO | WO 2004/059900 A2 | 7/2004 |

OTHER PUBLICATIONS

Alfonso Gerevini, Allesandro Saetti, Ivan Serina, Planning Through Stochastic Local Search and Temporal Action Graphs in LPG, Dec. 2003, pp. 239-290.

Mihai Boicu, Gheorghe Tecuci, Dorin Marcu, Michael Bowman, Ping Shyr, Florin Ciucu, Cristian Levcovici, Disciple-COA: From Agent Programming to Agent Teaching, Jan. 2000, pp. 1-8, Learning Agents Laboratory, Department of Computer Science, George Mason University, Fairfax, VA 22030.

U.S. Appl. No. 11/208,802, filed Aug. 22, 2005, Howard et al., entitled "Method To Incoporate User Feedback Into Planning With Explanation."

Michael A. Bauer and Tong Wang, "Strategies for Distributed Search", ACM (1992) 089791-472-4/92/0002/0251.

Lloyd,S. (1982) Least Squares Quantization in PCM. IEEE Trans. Information Theory 28, 129-137.

Gaudiano, P., Shargel, B., Bonabeau, E and Clough, B. (2003) Swarm Intelligence: A new C2 paradigm with an application to control swarms of UAVxs. Report No. AFRL-VA-WP-TP-2003-335, Air Vehicles Directorate, AFRL, Wright-Patterson Air Force Base.

Gerkey, B., Vaughn, R. and Howard, A. (2003) The Player/Stage Project: Tools for Multi-Robot and Distributed Sensor Systems. Proceedings of the 11th International Conference on Advanced Robotics, Coimbra, Portugal. 317-323. See http://playerstage.sourceforge.com.

Hart, D. and Craig-Hart, P. (2004) Reducing Swarming Theory to Practice for UAV Control. IEEE Aerospace Conference, Big Sky, MT.

Parunak, H., Brueckner, S. and Odell, J. (2003) Swarming Coordination of Multiple UAVs for Collaborative Sensing. 2nd AIAA Unmanned Unlimited Systems Technologies and Operations Land and Sea Conference, San Diego, CA.

Parunak, H., Purcell, M. and O'Connell, R. (2002) Digital pheromones for autonomous coordination of swarming UAVs, in Proceedings of First AIAA Unmanned Aerospace Vehicles, Systems, Technologies, and Operations Conference, Norfolk, VA, AIAA.

Payton, D., Daily, M., Estkowski, R., Howard, M. and Lee, C. (2001) Pheromone Robotics in Autonomous Robots 11(3), Kluwer Academic Publishers, Boston, MA, 319-324.

Payton, D., Estkoweki, R. and Howard, M. (2003) Compound Behaviors in Pheromone Robotics. Journal of Robotics and Autonomous Systems, Special issue on best papers presented at IAS-7 Conference, Elsevier, 229-240.

Payton, E., Rosenblatt, J. and Keirsey, D. (1990) Plan Guided Reaction in IEEE Trans Systems Man & Cybernetics 20(6), 1370-1382.

* cited by examiner

SYSTEM AND METHOD FOR AUTOMATED SEARCH BY DISTRIBUTED ELEMENTS

BACKGROUND OF THE INVENTION

1. Field of the Invention

The present invention relates to systems and methods for conducting automated searches. More specifically, the present invention relates to systems and methods for performing automated geographical searches with autonomous agents.

2. Description of the Related Art

Robots are increasingly employed for dull, dirty and dangerous tasks. For many diverse applications, there is a need for a system or method for controlling teams of three to 20 robots in cooperative missions, with minimal human supervision. Teams of robots are used underwater to comb bays for mines and researchers are using robots to monitor the ocean chemistry for changes. Missions are being considered by NASA that might utilize teams of robots. Commercial robots are becoming cheaper and will be used for research, search and rescue, and other applications.

In this regard, the robots are typically controlled with a centralized system. A centralized planner typically ascertains how to partition tasks among the robots and allocates the tasks with specific coordination primitives. Each robot has a state in the search space. Data with respect to the location of each robot must be communicated to the centralized processor, analyzed for coordination and communicated back to the robots.

This centralized approach is bandwidth intensive and is therefore not easily scalable. This limits this approach for more demanding current and future applications.

Hence, a need exists in the art for a decentralized approach which would allow robots to operate autonomously yet cooperatively with minimal data flow therebetween.

SUMMARY OF THE INVENTION

The need in the art is addressed by the present invention which provides an efficient automated distributed search mechanism for any application that needs to search a data space for a specific type of target/object. In a most general implementation, the inventive system includes a detector for detecting an object of interest; a model for predicting a behavior of the object; and a mechanism for directing the detector to the object in response to data output by the model.

In a specific application, the inventive system is disposed on multiple mobile platforms. The platforms may be robots, unmanned aerial vehicles (UAVs) or mobile data structures by way of example. In the best mode, the model is a predictive model adapted to provide a probability distribution characteristic of an object or target in the form of a set of particles. The particles are moved to reflect the behavior of the object. Plural models may be included to account for other hypothesized identities or characteristics of the object. As updates on the objects behavior and/or characteristics (e.g. location) are received, the model is updated accordingly in each mobile platform. The particles are grouped in clusters and each robot is assigned to begin its search at a center of mass of a respective cluster.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

In accordance with the present teachings, probabilities of a presence of an object are represented by dynamic clusters of particles. Each particle (which exists only in memory) has the same constant value, so dense clusters of particles imply a high probability that there are objects in that area. Each robot creates distributions of particles on its own map of the area in its memory when it is informed of the possibility of a new object. If it gets an update on an object it has previously been informed of, it adjusts the particle distributions as needed to represent the new information. The particles have a type, and can also have a priority or weight.

Each robot receives periodic updates from the users of the system containing probabilistic information about one or more known or suspected objects and the robots are tasked to find that object and identify it. The update may contain one or more possible classes that the object may belong to, each with an associated non-zero likelihood. For example, a moving object might be a tank (30% probability), or a car (60%), or a school bus (10%). If no classes are communicated, the robot would give every possibility an equal likelihood. Each robot that receives this message would create a cluster of probability particles to represent each possibility. For example, the 30% probability that the object represents a tank causes 30 particles of the tank class to be created in memory, possibly in a pseudo-Gaussian distribution about the location on the map where the object was sighted. Likewise it would create 60 car class particles and 10 bus class particles in the same location.

Periodically thereafter the robot will run a behavioral model (for example, a multi-hypothesis particle filter) that will move each particle according to its type, in a direction that the model predicts that type of object would move, with some randomness. Thus, bus particles might generally be moved toward a nearby school, although in the absence of periodic updates they could spread out toward houses or more distant schools.

In accordance with the present invention, each robot is attracted to dense areas of particles; this drives the search behavior of the robots. Each robot independently clusters the particles in its own memory and chooses a cluster to search. Robots coordinate their search by using identical algorithms for generating and moving particles and also by modeling each other's behavior, updated by infrequent messages as to their positions. This modeling approach reduces the algorithm's dependence on accurate communication. Each robot clusters enemy or target probability particles using a clustering technique that creates K clusters, one for each robot. K-means is a simple example of such a clustering technique, although more intelligent and adaptive clustering techniques could produce better performance. Each robot takes the cluster whose mean is closest to their current position. In effect, the robot has chosen a unique search task assignment, represented by the location of the particles.

As a vehicle searches an area, any particles in that area are removed from its internal map for a time. The particles will return to the internal map later unless the object is found. The invention also uses a static class of particles on geographic regions that should be kept under surveillance. This kind of particle does not move, and always comes back a certain time after being removed.

For the purposes of this invention, the term "robot" shall mean a situated autonomous agent with mobility, sensors and communication capability. The robot may be situated in any type of dimensional space (e.g., a database). Route-following, obstacle avoidance, and sensor management are managed by lower level processes on which the inventive algorithms depend. The invention makes high level decisions about where to go, but does not endeavor to provide details about how to get there. For the purposes of the present invention, the term "object" shall mean something of interest that is to be searched for. An object may be stationary, such as a building, or mobile, like a vehicle. It may or may not have a known identity. Most of the examples provided herein assume that one is unsure of the identity and one purpose of searching is to identify the object. When the object is a stationary object such as a building, often its identity is only secondary. It is the entities that might enter or leave the building that are of primary interest.

In an illustrative embodiment, the inventive method consists of the steps diagrammed in FIGS. 1-4. The method illustrated in FIGS. 1-4 represent behaviors running on each robot in parallel, each behavior operating on the "particle memory" that is in the local data structure called a "situational map".

Figure 1:
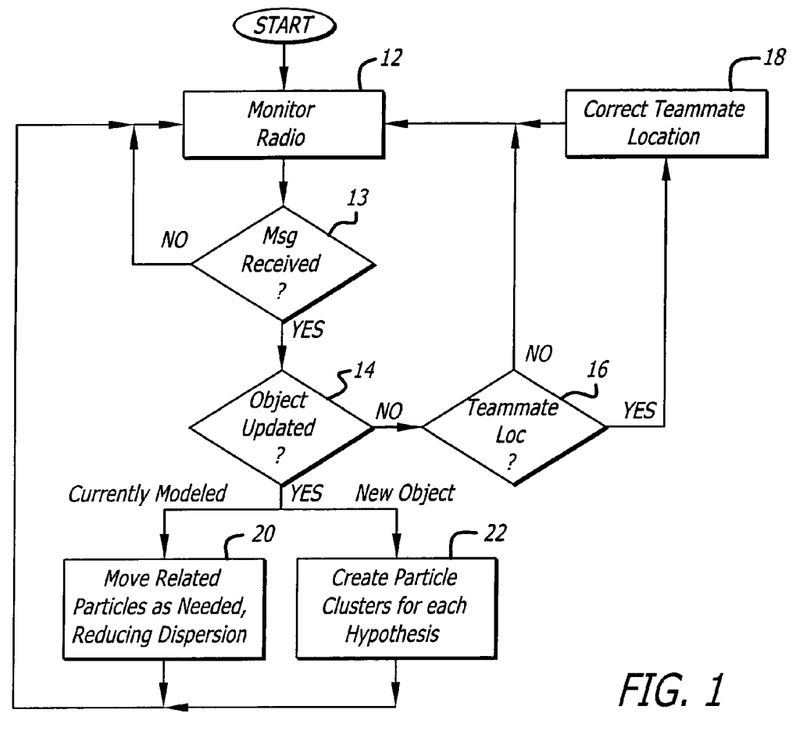
FIG. 1 is a flow diagram that shows an illustrative implementation of the communication function behaviors of each robot in accordance with the present teachings.

FIG. 1 is a flow diagram that shows an illustrative implementation of the communication function behaviors of each robot in accordance with the present teachings. The method 10 includes the step 12 of monitoring a radio. On receipt of a message, the method checks for an object update in the message at step 14 thereof. Since each robot is modeling the movements of its teammates between updates, it may have to correct the location of that teammate once it does receive an update. Since it also removed particles as the teammate moved to reflect areas that have been searched, if the teammate update is significantly different from the model, the robot will need to also correct the particle distributions. Hence, if no object update is received, at step 16, the method checks for an update regarding a teammate location. If the message is a teammate location update, then at step 18, the teammates location is updated. If not, the system continues to monitor the radio.

If, on the other hand, the message includes an object update, the method checks to see if this is a currently modeled: object. If so, then at step 20 the particles related to the currently modeled object are moved as needed, reducing dispersion as a consequence of reduced uncertainty. Otherwise, at step 22, a particle cluster is created for each new hypothesis. In this connection, "particle movement" refers to the process of moving the probability distributions representing objects in accordance with some model of the way each hypothesis of the object identity would move. For example, a multi-hypothesis particle filter (as described in radar tracking literature) would be one way to implement this. Particle dispersion is reduced when new information is received, because uncertainty is reduced.

Figure 2:
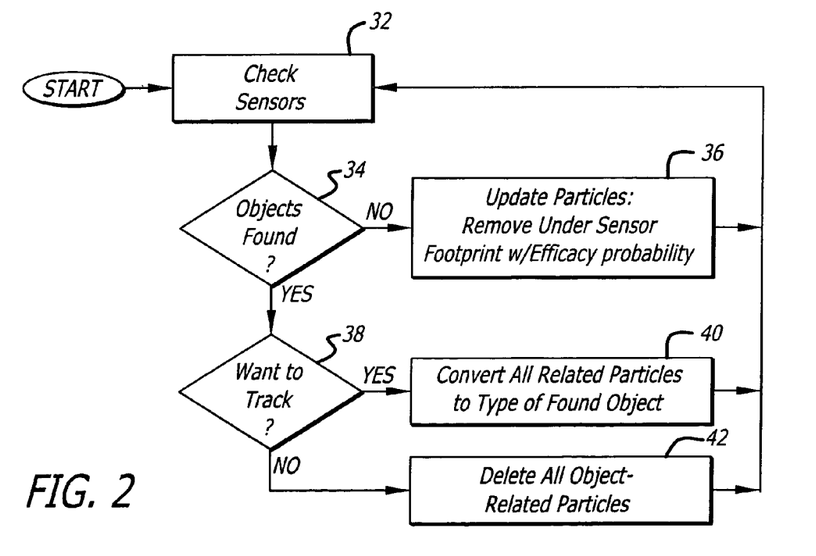
FIG. 2 is a flow diagram showing sensor management functions executed by each robot in accordance with an illustrative embodiment of the present teachings.
Figure 5:
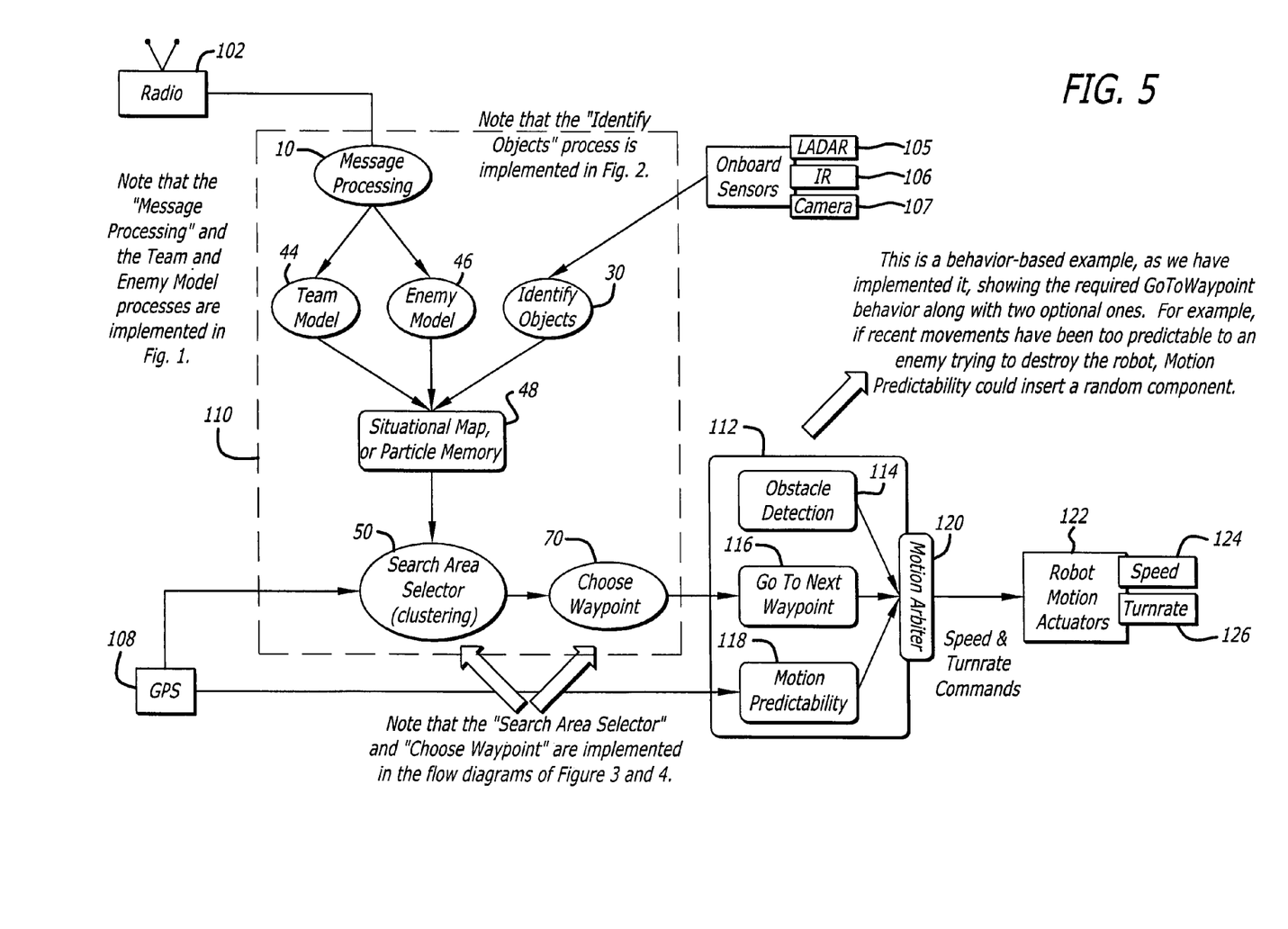
FIG. 5 shows a block diagram of an illustrative robot control architecture adapted to implement the teachings of the present invention.

FIG. 2 is a flow diagram showing sensor management functions executed by each robot in accordance with an illustrative embodiment of the present teachings. Both the sensor management functions and the communication functions act on a population of probability particles. As illustrated in FIG. 5 and described in the Architecture section below, the sensor management and communication functions work in parallel, independently operating on the particle memory. The motion control functions are influenced by those particles, as described below. In FIG. 2, at step 32, the robot checks its sensors. If, at step 34, an object is not found, then at step 36 the system updates its particles by removing those particles under its sensor footprint in accordance with an efficacy probability.

On the other hand, if at step 34 an object is found, then at step 38, the system decides whether to track the object or not. If the system decides to track the object, then at step 40, all related particles are converted to the type of object found. If the system decides not to track the object, all object related particles are deleted. The decision to track or not to track is made ultimately by the user, either by explicit communication, or implicitly, as a policy defined for certain object types or environmental conditions. In accordance with the present teachings, motion and sensing are executed in parallel. These robot subsystems communicate indirectly by acting on particle memory.

Particle Management

Figure 3:
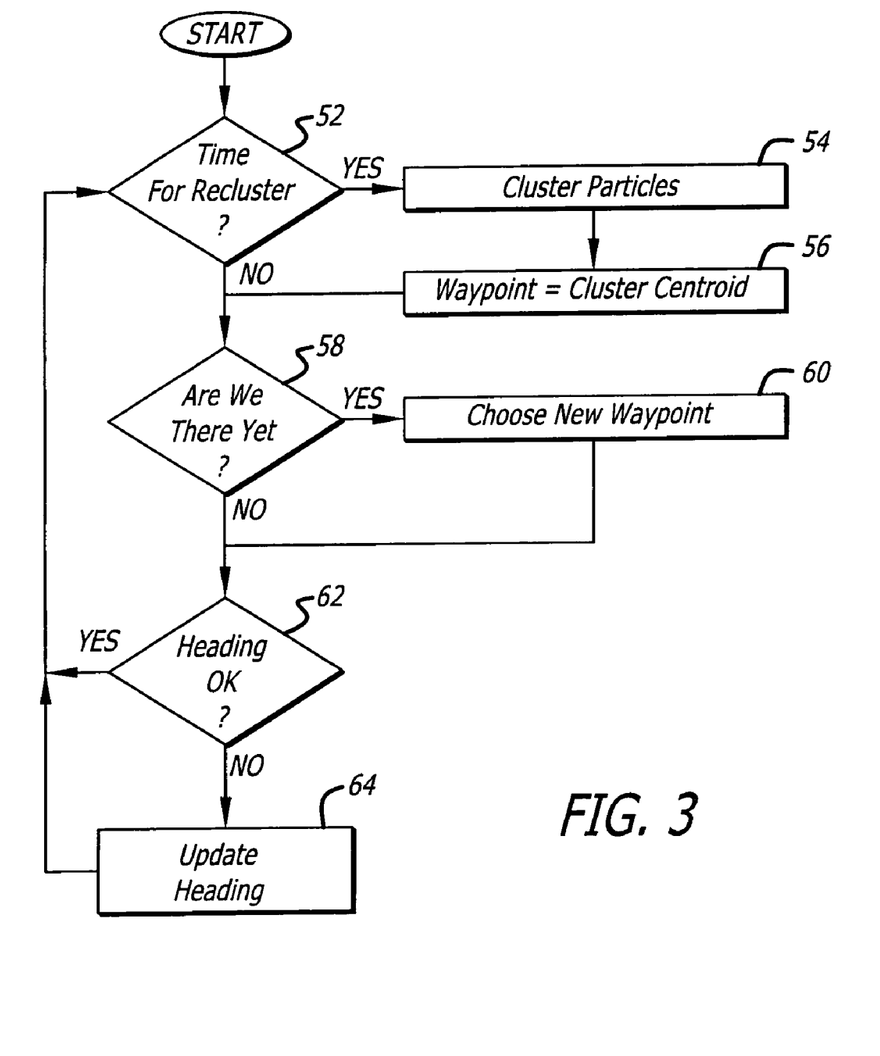
FIG. 3 is a flow diagram of an illustrative method for motion control executed by each robot in accordance with the present teachings.
Figure 4:
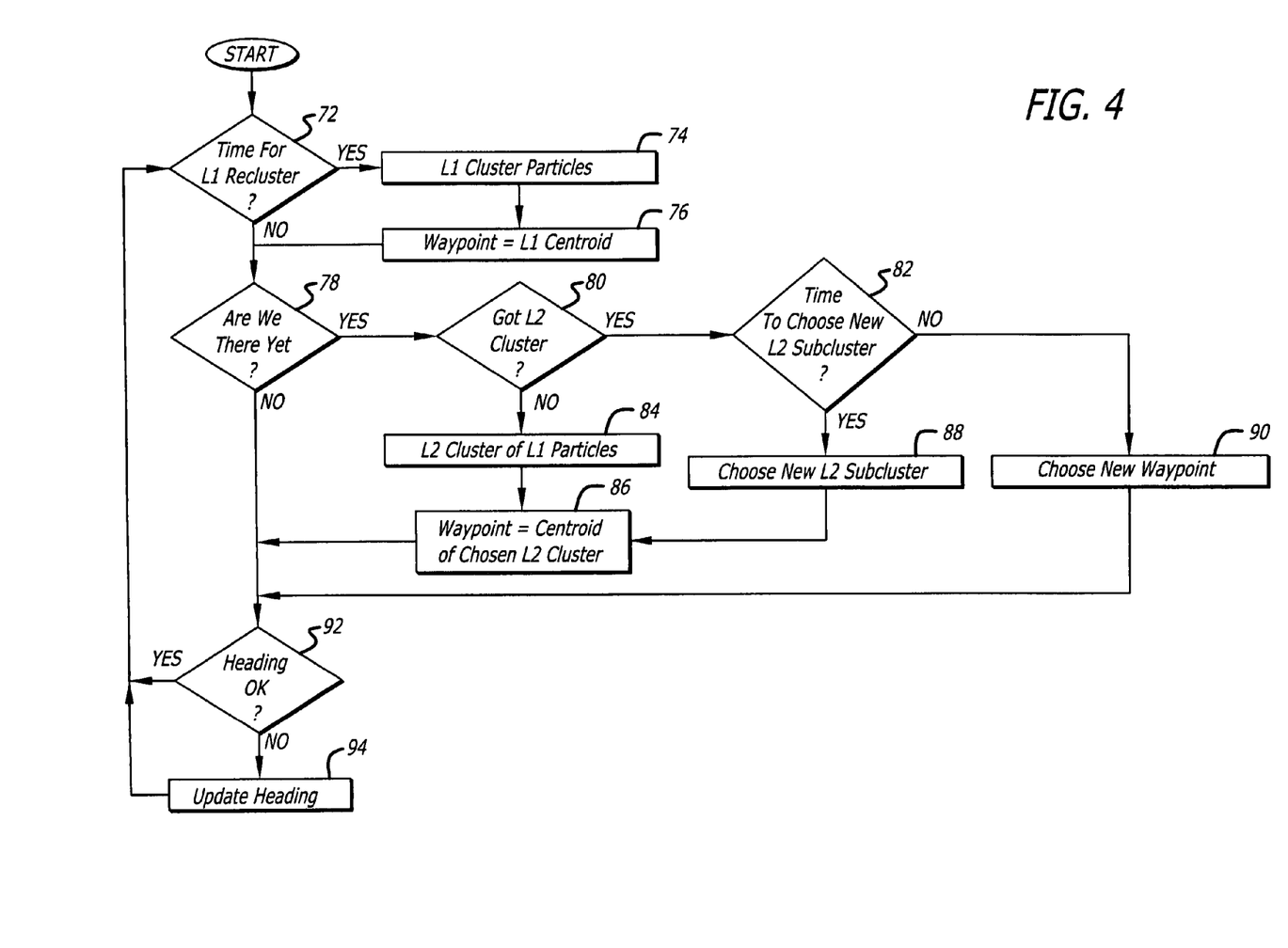
FIG. 4 is an alternative implementation of a method for motion control in accordance with the present teachings.

In accordance with the present teachings, the need for communication between team members is minimized and search performance degrades gracefully if communication is interrupted. This is due to the fact that each team member models every other team member and updates that model whenever a location is confirmed, either visually or by communication. A temporary communication blackout means that, over time, the teammate model's predictions can diverge from the real movements of the teammate vehicle. The divergence is a function of the speed and maneuverability of the vehicle, likelihood of encountering unpredicted obstacles, and the amount of randomness used in the decision function for how to search a given cluster of particles. FIGS. 3 and 4 illustrate one possible way to organize the search of a given cluster.

FIG. 3 is a flow diagram of an illustrative method for motion control executed by each robot in accordance with the present teachings. The motion control loop constantly checks status and ensures that the robot is moving in the right direction. As illustrated in FIG. 3, at step 52, the system checks a timer to ascertain whether the time is right for a recluster of particles. Recluster timing could be implemented as an actual timer or the result of some metrics on the particles such as a dynamic load-balancing algorithm. If the time is right for a recluster, then at step 54, the particles are reclustered, and at step 56 the waypoint is set to the centroid of the cluster. Task allocation is implemented by partitioning the clusters into K distinct subsets, one for each of K robots to search. One way to accomplish this is by a clustering algorithm such as K-means.

If at step 52 the robot determines that it is not time to recluster, then the method 50 executes a motion control loop at step 56. The motion control loop checks whether the robot has reached or passed the waypoint at step 58. If so, then at step 60 the loop chooses the next waypoint, and then adjusts the heading as needed to get there in steps 62 and 64. If the robot has not yet reached the waypoint in step 58, then the loop proceeds to step 62 where the robot checks whether its current heading will take it to the waypoint. If the heading is OK, the loop returns to the time for re-cluster step (step 52). Otherwise the heading is updated in step 64 before returning to step 52.

This behavior could run in parallel with other behaviors or functions such as obstacle-avoidance that have input to the final control signal that goes to vehicle actuators.

The step of choosing a waypoint in step 60 may be accomplished by sorting the particles in the current cluster by importance (weighting), distance, and other factors, and choosing the best particle to head toward. Other factors may include mobility considerations of the robot, such as maximum turn radius required to head toward the particle.

The step of clustering particles (step 54) includes the partitioning of particles into K unique subsets in such a way that it is clear to all robots which robot should search which subset or cluster. One such method is described below in some detail in the section titled Particle Clustering.

In some cases a robot's chosen cluster may be patchy and the patches may be separated by wide areas. The L2 cluster, shown in FIG. 4 below, will discover these sub-patches. Each sub-patch is searched in turn. For each sub-patch, the robot chooses one of the particles to go to at a time, clearing particles as it goes (per step 36 of FIG. 2), until the density of particles is reduced enough that the other sub-patches become more urgent.

FIG. 4 is an alternative implementation of a method for motion control in accordance with the present teachings. In the implementation 70 of FIG. 4, the system performs this second clustering of particles in a first cluster L1. Each subcluster L2, in the first cluster L1, is searched before moving on to the next subcluster. Hence, FIG. 4 is similar to FIG. 3 with the addition of steps for L2 clustering.

As illustrated in FIG. 4, after doing a level 1 cluster (L1) to partition the global search space among team members, each member will do a level 2 cluster (L2). L2 finds sub-clusters in the member's L1 cluster. One way to do the L2 cluster is to use a K-Means algorithm with K equal to some small arbitrary number, large enough to find dense sub-clusters. The 'Kmeans' is described below in the section called "Particle Clustering". The number K is entirely dependent on the needs of the domain. A more intelligent clustering algorithm could be parameterized to find the right size of clusters in a domain-independent way without departing from the scope of the present teachings.

Hence, in FIG. 4, if at step 72 it is determined to be a time for L1 re-clustering, then at step 74 an L1 Kmeans is performed. As in step 52 above, recluster timing could be implemented as an actual timer or the result of some metrics on the particles such as a dynamic load-balancing algorithm. Next, at step 76, the waypoint is set equal to the centroid of the L1 cluster, as in step 56 above. In step 78 the robot determines whether it has reached or passed the current waypoint. If not, it checks the to make sure the robot is headed toward the waypoint in step 92. If the heading is OK it returns to step 72. If not, it updates the heading in step 94 before returning to step 72.

If step 78 determines that the current waypoint has been reached, method 70 checks whether an L2 clustering of the L1 particles has been performed, in step 80. If not, the L2 clustering is performed in step 84, and step 86 sets the waypoint to the centroid of a chosen L2 subcluster. It may not matter which subcluster is chosen, or a choice may be made based on factors such as the priority or number of the particles in that subcluster, etc. Once a waypoint is chosen, the method moves to step 92 to check heading as mentioned above. If step 80 determines that an L2 subcluster has been created, then step 82 tests whether it is time to move from the L2 subcluster the robot is currently searching to another one.

There could be many criteria for this decision. In any case, the system should thoroughly search each area without ignoring other areas. If step 82 decides that it is time to move, a new subcluster is chosen in step 88, the waypoint set in step 86, and then the heading checked in step 92. Otherwise, the robot will continue to search the same L2 subcluster by choosing a new waypoint in that subcluster, the same way that was described in step 60 of FIG. 3.

In the best mode, the decision for choosing a sub-patch is a function of the priorities of the types of particles that are in that patch, the number of particles in the patch, and the density of the patch. One simple way to do this is by weighting the sum of particles in each patch by their priorities, and dividing by the area of a bounding circle. One method to choose a particle to go to first is to sort the particles in the sub-patch by their priority levels and by their distance from the robot, and go to the first on the list. This scheme results in an erratic path that should be less predictable by adversaries, but may require more maneuverability and may be less energy efficient that other schemes. More intelligent schemes can be envisioned for particular applications, calculating trajectories that maximally sweep out the most high priority particles without departing from the scope of the present teachings.

The decision as to when to abandon one sub-patch and go to another is based again on the subpatch decision function described in the previous paragraph, but to avoid flip-flopping it would be reasonable to continue searching the current sub-patch until its decision function value (e.g., weighted sum described above) falls below that of the next-best patch by some threshold.

Over time, the particle distributions created to model the movements of each object are moved by the behavior model. They move with some randomness, and spread out as they move to reflect growing uncertainty about position.

FIG. 1 shows that when information is received about one of these objects, the distributions for the object will contract to some extent, reducing their dispersion to reflect more confidence in the position of the object. It is also possible that a message will rule out one or more classes to which an object might belong. This will happen when another search platform finds the object and identifies it. It is less convincing when a robot searches the areas covered by clusters representing some of the hypotheses and does not find anything, because the object might have evaded detection. In that case, those hypotheses might be reduced but not eliminated.

Operational Picture Coherence

In accordance with the present teachings, when each robot is informed of the location of an object, the robot makes up its own distribution of particles. Again, there is a random element involved in creating the pseudo-Gaussian distributions. As each robot moves, it clears particles under its sensor sweep with some probability. Likewise, each models the movements of its teammates (e.g., a straightforward extension of the last reported position, speed, and heading) and clears particles in its own memory that are under the teammate's sensor sweeps. There can be some variation between the particle distributions for the same hypothesis about the same object in each robot's memory. This means that each robot may cluster somewhat differently, and decide to re-cluster at slightly different times even though they are running the same decision metric.

The controllable parameters are time between robot status reports, the amount of information shared in those status reports, and the probability and randomness with which particles are placed, moved and removed. For each domain the parameters will be somewhat different and experimentation may be required to ascertain the optimal parameters.

Search Efficiency

The number of vehicles required to efficiently search an area for mobile objects is a function of the geographic extent of the search area, the speed of the search robot and maximum possible speed of the searched-for objects, and the likelihood of a search robot detecting an object in its sensor range.

Architecture

FIG. 5 shows a block diagram of an illustrative robot control architecture adapted to implement the teachings of the present invention. In FIG. 5, hardware is represented with rectangular boxes and software processes with rounded boxes or ellipses. Each robot has a system 100 including a radio transceiver 102, and onboard sensors 104, including by way of example laser radar (LADAR) 105, infrared (IR) 106 and a camera 107. In addition, the system 100 includes a signal and data processor 110 (shown dashed) along with a Global Positioning Sensor 108, a motion control subsystem 112 and motion actuators 122.

The radio 102 receives messages from other robots and/or from a central control station and passes the messages to the processor 110 for processing in a message processing software routine 10. The message processing routine 10 is described above with respect to FIG. 1. Data from the onboard sensors 104 is processed by the sensor processing routine 30 of FIG. 2. Motion and sensing are executed in parallel by acting on particle memory 48 in accordance with a team model 44 or an enemy model 46.

The team and enemy models were pre-loaded into the robots, and may or may not learn from experience. The Enemy Model is the behavioral model that creates, maintains and moves probability distributions as needed to appropriately represent the incoming reports from the users and from other searching teammates. It models the movements of the objects of interest. The Team Model is a separate behavioral model of the other vehicles that are participating in this cooperative search, and is updated by situation reports from the other teammates. The Team model estimates the movements of teammates and moves particles to represent the areas searched by the other teammates. These distributions go to a Search Area Selector 50 that does the clustering and choice of L1 and L2 clusters as described above with respect to FIGS. 3 and 4. The choice of L1 cluster is dependent on the team model's information about where each teammate is.

Once a cluster is selected to be searched, the Choose Waypoint function 70 chooses destinations within that cluster. In this case, we blend that choice with other concerns, like avoiding obstacles, etc. in the behavior arbitration unit 112. The decision is made by a motion arbiter 120 which may be implemented with the cited invention by David Payton. Speed and turn rate commands are output by the motion arbiter 120 and used by motion actuators 122 to control the direction and rate of motion of the robot.

Operation

"Electronic Intelligence" data (ELINT) is a fusion of sighting reports from people in the field, theories of intelligence analysts, and sensor data from satellites, aircraft, and other sources. ELINT updates represent uncertain information; even if something looks and acts suspicious, it is necessary to get close-up confirmation of whether it is an enemy tank, a civilian vehicle, a school bus, etc. In accordance with the present teachings, when such a message is received, each robot or UAV records it in a local dynamic data structure called a situational map, in the form of a cluster of particles to represent each hypothesis. Different classes of particles represent different theories as to the identity of the object, with associated threat level or priority.

In between ELINT updates, each UAV moves the particles using a simple multi-hypothesis particle filter that implements a behavioral model for that type of entity. For example, the particles representing a school bus might be moved toward a school zone, and those representing enemy tanks would be attracted toward potential targets such as a suspected fuel dump or a power plant. This is illustrated in FIG. 6 below.

Figure 6:
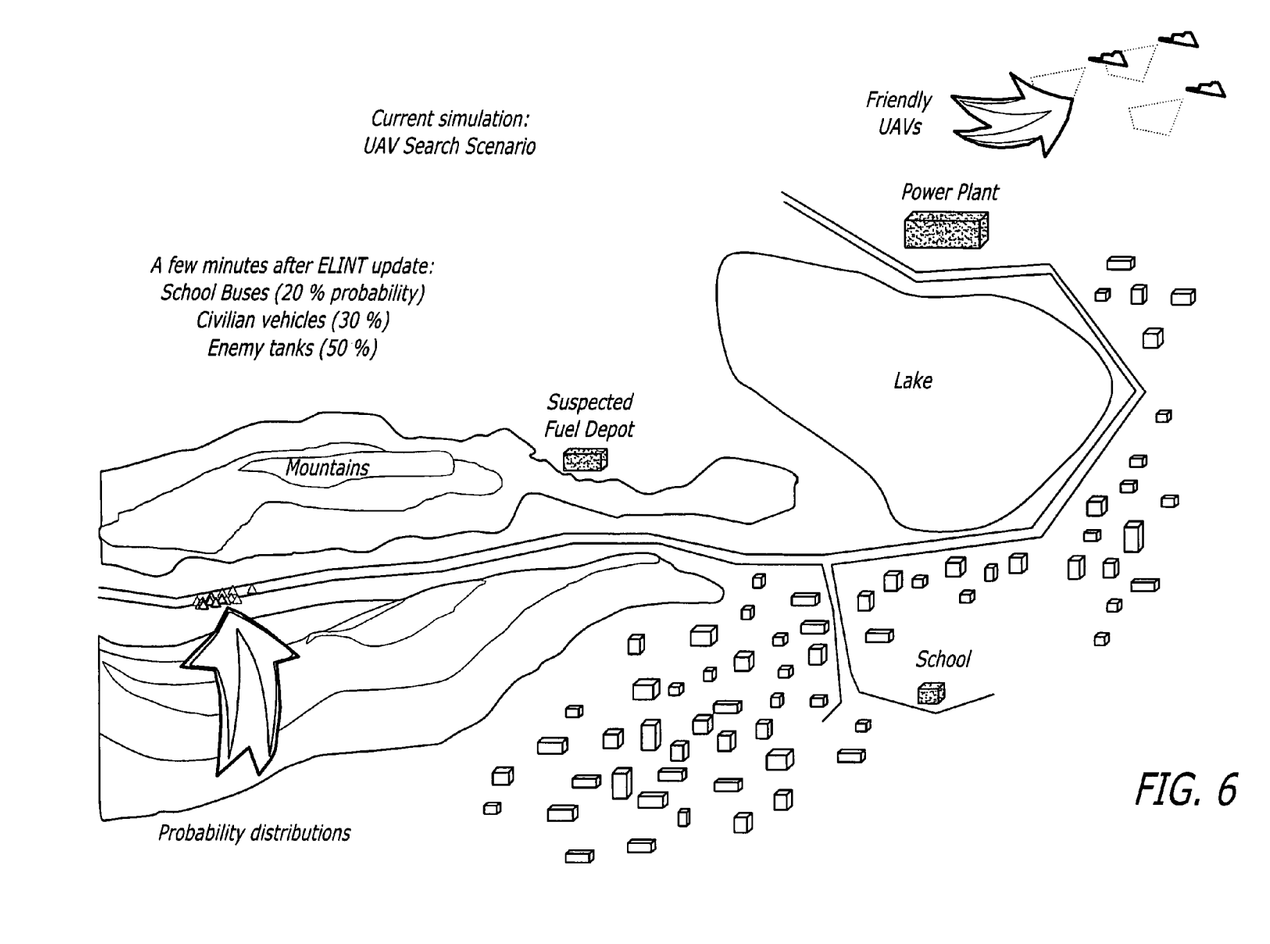
FIG. 6 is a scenario simulated in accordance with the present teachings a few minutes after an information update.

FIG. 6 is a scenario simulated in accordance with the present teachings a few minutes after an ELINT update. UAVs at upper right get ELINT (electronic intelligence) report about a possible target along with likelihoods of its identity (car, tank, or bus). Each UAV creates probability particles in its particle memory to represent the target. Precise particle locations are different on each UAV, but the distributions are statistically equivalent. In the figure, the town southeast of a highway and a few identified buildings are attractors for behavior models. Although the distributions of the particles are statistically equivalent to the local particle memory of other UAVs, the locations of individual particles are not the same.

Figure 7:
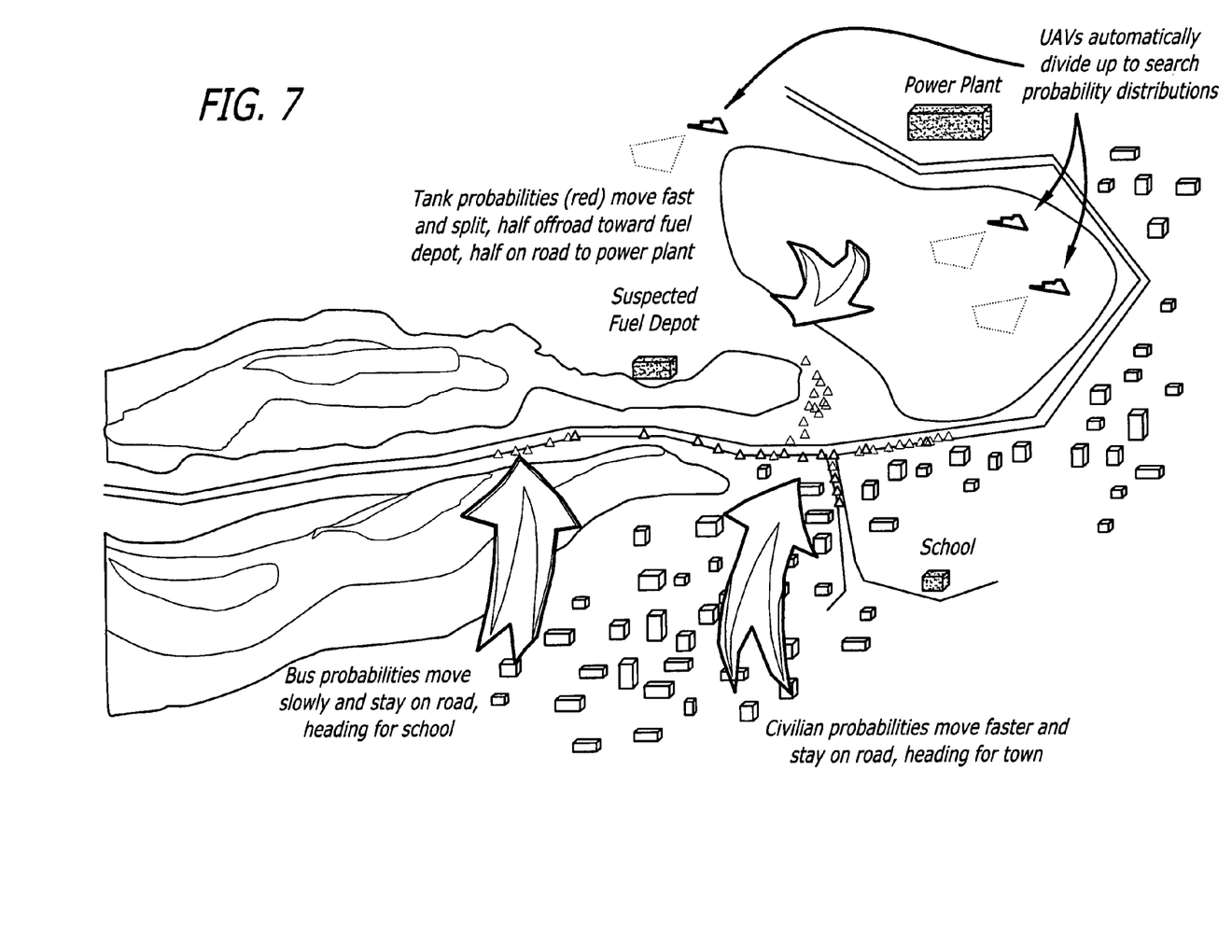
FIG. 7 is a scenario simulated in accordance with the present teachings ten minutes after an information update.

FIG. 7 is a scenario simulated in accordance with the present teachings, at a time ten minutes after an ELINT update. The probability particle distributions for each hypothesis are moved independently by the appropriate behavioral model. Note that in order for particles to get this spread out, there would have been no updates on object position in some time.

Figure 8:
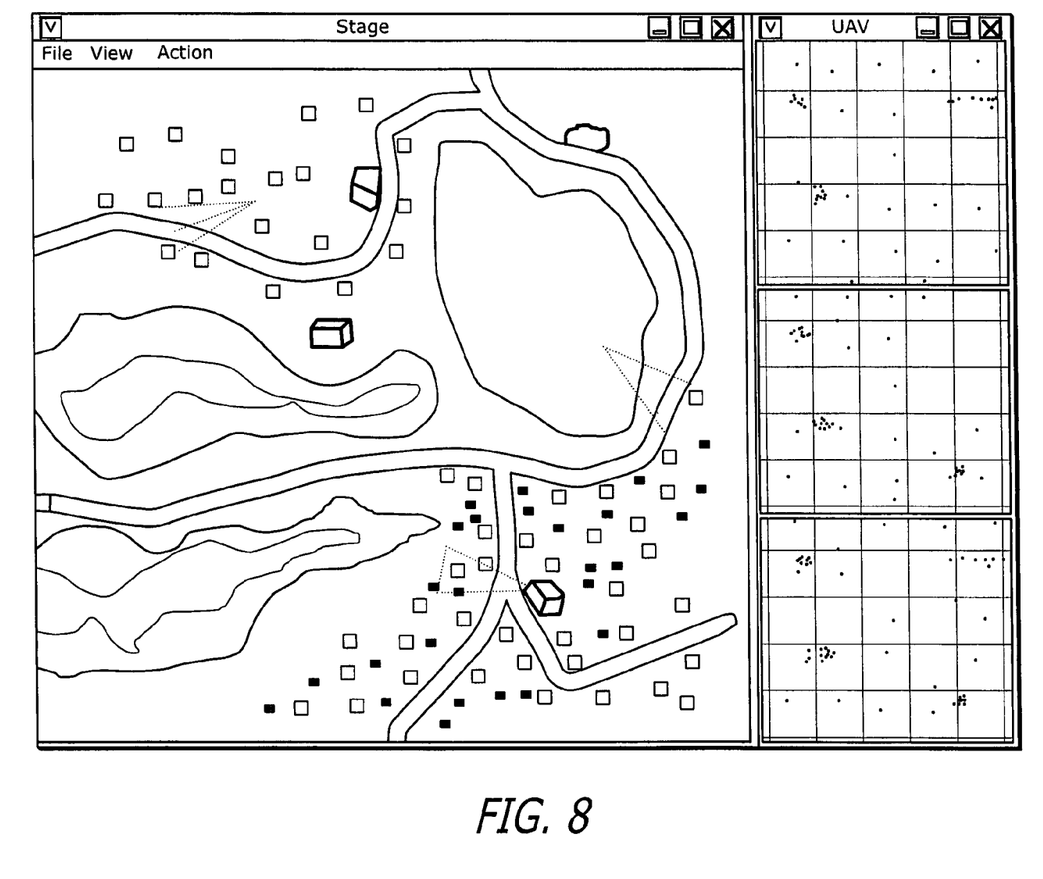
FIG. 8 is a screenshot of the simulation for the scenario illustrated in FIGS. 6 and 7.

FIG. 8 is a screenshot of a computer simulation of the scenario illustrated in FIGS. 6 and 7. A public-domain simulation called PlayerStage (Gerkey et al 2003) was used. A team of UAVs was configured in accordance with the present teachings, each with a sensor with a realistic footprint, a GPS, a multi-channel radio, and simple object recognition using fiducial detection. In the illustrative embodiment, the UAV control system performs arbitration between 3 behaviors: go-to-point, avoid-obstacles, and persist-turn. The outcome of the arbitration is speed and turn-rate commands to a movement actuator (Payton et al. 1990), which observe somewhat realistic constraints. In PlayerStage, each agent has its own private memory, and any information to be shared must be explicitly sent in a message.

The three dark windows at the right of FIG. 8 represent situational maps for each UAV. Note that the particle distributions in the maps are not identical. The UAV in the upper left quadrant (UAVs have sensor fans) was attracted to that area by the particle cluster in its situation map, and has detected a tank. The UAV in the lower right quadrant has just identified a school bus and wiped its particles of its situational map (the top one). The other two UAVs have not yet deleted the particles representing that vehicle from their maps. The UAV in the lower right is now heading for the lower left quadrant, along the road, where a group of particles has just appeared, representing a tank that was just reported by ELINT.

Communication is needed to receive periodic ELINT updates on the locations of targets and teammates. But communication in these domains is unreliable and subject to jamming, antenna misalignments (during maneuvers), and atmospheric effects. The inventive approach to this problem is to have each UAV probabilistically model the movements of team members and targets between communication events. This results in search behavior that degrades gracefully during communication dropouts.

As discussed above, as a vehicle searches, it removes particles from its situational map in the area under its sensor footprint, subject to detection probability. Those particles will be returned to the map after a timeout. The clearing of particles is not communicated between teammates since each UAV has a slightly different set. Instead, each UAV clears particles in its own map using a model of teammate movements. When a message is received reporting a teammate's position, the particle map can be corrected if its position differs significantly from that predicted by the model. If the object is found, its identity is confirmed and all particles representing incorrect hypotheses are destroyed. The object information is communicated to the other vehicles and they make similar changes to their own private situational maps.

To keep static geographic regions under surveillance a special class of static particles may be employed. This kind of particle doesn't move and always returns after a timeout. By adjusting the rate at which the particles return, statistical control can be exerted over how often an area is searched.

Particle Clustering

Each UAV is attracted to dense areas of particles. This drives the search behavior. To avoid having to negotiate with teammates over specific search areas or task assignments, each UAV partitions the particles using an identical clustering algorithm and selects the closest. This implements a simple decentralized task allocation technique. UAVs coordinate their search by modeling each other's behavior, updated by infrequent (every few seconds) messages as to their positions.

The K-means algorithm (Lloyd 1982) is used to cluster enemy probability particles. Briefly, if the probability particles are represented as vectors $\{p_1, \ldots p_n\}$, $p_i \in \mathbb{R}^2$, the goal is to find K clusters, each one represented by a vector $m_k \in \mathbb{R}^2$ $k = \{1 \ldots K\}$, and assignments of data points to clusters such that 'compact' clusters are formed. We choose K to be the number of UAVs, each $UAV_i$ taking the cluster whose mean is closest to its current position. Clustering minimizes the objective function; H:

$$H(c, m_1, \ldots, m_K) = 1/n \sum_{i=1}^{n} \left\| p_i - m_{c(i)} \right\|^2.$$

Here c maps particles $p_i$ onto clusters located at $m_{c(i)}$, and H is a measure of the distortion of representing each particle by the mapping c. The algorithm is initialized with the $m_{c(i)}$ set to the locations of $UAV_i$. On each iteration, each probability particle $p_i$ is assigned to the nearest cluster location $m_{c(i)}$ and then each $m_{c(i)}$ is moved to the centroid of its assigned particles, reducing the distortion H until at some point there is no more improvement; the mapping c stops changing. Since each $UAV_i$ is mapped to a unique $m_{c(i)}$, this results in a unique allocation of particles to UAVs.

Other clustering techniques may be used without departing from the scope of the present teachings. The standard K-means algorithm doesn't guarantee that each mean has a certain number of points assigned to it—a cluster can end up containing no points. Also, it would be useful to consider parameters such as priority or urgency weightings given to certain types of particles (i.e., $p_i \in \mathbb{R}^d$, $d > 2$).

Searching Within Clusters

In accordance with the present teachings, when a UAV reaches the centroid of its self-assigned cluster, it chooses a probability particle in the cluster to move toward. This can be as simple as going to the closest, but we also consider particle priority or urgency, subject to maneuverability constraints. Thus UAVs should check out tank hypothesis particles before checking bus hypotheses. This is implemented by sorting the particles in the cluster by priority, distance, and yaw angle off the current velocity vector. High priority, low distance, and small required yaw are best. To add some more randomness the next waypoint may be a random choice of the top 20% of the best particles.

In adversarial search, it is desirable to avoid running predictable search patterns that can be exploited by an enemy. The procedure described above results in very unpredictable movements. Of course there is a tradeoff between predictability and efficiency and in many ways the less predictable a search pattern, the less energy-efficient. This tradeoff can be controlled by adjusting the weighting on the yaw criterion in the 'next particle' sort mentioned above, and/or changing the number of particles in the random selection.

The situation is dynamic. New objects are reported and old ones are identified and sometimes targeted. All data is fused into this common operational picture of particles with priorities, so the reasoning required to make search decisions is quite simple and amenable to a behavior-based approach.

Particle distributions are generated, moved and cleared independently by each UAV based on infrequent information updates. When it is time to re-cluster, the differences between the situational pictures maintained by each UAV can lead to somewhat different cluster locations ($m_{c(i)}$), which can result in surprising behavior. The re-cluster decision may be based on metrics with respect to changes in the particle distribution the search progresses. Another approach would be to employ a clustering technique that changes more slowly or to require more coordination before re-clustering.

Information Coherence Issues

When an ELINT message announces a new target, each UAV makes up its own pseudo-random distribution of particles based on the message information. Subsequent ELINT messages may or may not update the location and/or identity of the target. As each UAV moves, it clears particles under its sensor footprint with some probability. Likewise, it models the movements of its teammates—currently a simple linear interpolation from the last reported position, speed, and heading—and clears particles under each teammate's sensor sweeps.

To the right in FIG. 8 is one window for each of the three UAVs, showing the locations of particles on their situation map. A comparison between the three shows small random variations between the particle distributions that each teammate models. This means that when the vehicles decide to re-cluster, their clusters will vary to some extent.

Normally the differences in clusters between UAVs are minor and the system yields good behavior. This should be despite the fact that targets are popping up every few minutes primarily in three locations on the map and traveling mostly on roads. Although this often means that targets come close to each other, good results may be obtained with UAVs sending situation reports every 5 seconds including only position and velocity. Occasionally the differences may become significant, leading to search patterns that appear unproductive. There are a number of factors contributing to this problem, under the heading of situational coherence. The controllable parameters are time between UAV status reports, the amount of information shared in those status reports, and the probability and randomness with which particles are placed, moved and removed. The best choices of parameter values should depend on how close the targets are to each other. The closer the targets, the closer the UAVs, and the more coherent the situational pictures of each UAV must be to appropriately deconflict.

Precise predictions of another UAV's actions require precise knowledge of the values of every variable the other vehicle uses to make its decisions. It may be preferred to avoid dependence on the kind of high bandwidth reliable communication that would be required to do that. A better solution may be for each UAV to communicate its current location and velocity more frequently. In most cases, when ELINT updates on the objects are frequent, the UAV report rate can be adjusted to achieve very good coherence between situational pictures of each UAV. But if ELINT updates are jammed or there is just no new information on the objects of interest, the UAVs need to coordinate their reclustering. In accordance with the present teachings, the recluster operation is announced periodically and at that time every UAV announces a short history of its past locations. This would be a much shorter and infrequent message than what would be required to constantly maintain a coherent particle map. Each UAV would then repair its situational map and recluster. This should lead to very similar task assignments. In the worst case a confirmation step can be added after reclustering, to ensure that the resulting cluster centers each UAV calculates are reasonably similar.

In summary, communication bandwidth can be increased at times when coordination becomes less coherent. These times can be predicted based on local information, including the distance between UAVs and the rate at which position updates are received.

End users of this invention should experience a more focused and targeted search. Systematic or other brute force search mechanisms currently used (such as partitioning the area geographically and running search patterns) must rely upon speed and/or increased resources to increase probability of success. This invention improves the probability of finding the target objects without either upgrading the physical capabilities of the search platforms or increasing the number of platforms. It achieves this value-added increase in probability by providing search platforms a mechanism for narrowing the search area in the time domain. Although not required, updated time based situational information further reduces this search area by regrouping probability clusters to more closely represent the new information, and focus the search even more.

This invention is especially useful for a complex and dynamically changing situations, with reports coming in periodically over time, each with either updated information on previously mentioned objects or news of new objects, each with several hypotheses as to their identities. The inventive approach uses a very simple, straightforward method to fuse these reports into a common operational picture. By using populations of probability particles placed on a map, the positions and possible identities of objects are translated into a common representation that drives the search. The invention mitigates the need for complex fusion engines and mission management; fusion occurs by a natural overlapping of probabilities. Therefore, this capability should bring value to end users by increasing the probability of successful searches without increasing mission costs.

This invention also offers the possibility of having a distributed search team guided by many independent users. For example, if 6 UAVs are flying over a military battle zone, commanders all over the battlefield could supply reports of suspected enemy activity. The UAVs would become a general support asset, organizing automatically to search for enemies wherever they are reported. This organization would be automatic—there would be no need for a central control facility with operators fielding requests and deciding how best to serve them. Service could be on a priority basis—for example, the main effort of an attack might have a higher priority than a supporting unit, and this could be reflected in the priority of the particles each unit's requests causes to be placed on the map.

Most cooperative control techniques require frequent and reliable communication between robots. The present invention should relax this dependence by relying instead on modeling of the actions of other teammates between updates. This provides a graceful degradation of the search efficiency.

The automatic partitioning of the search task offers users indirect high-level control of multiple robots. Users express search tasks directly, in an intuitive way, by designating probability distributions on areas to be searched. This is an advance over current systems in which users must explicitly designate a set of robots and assign them tasks. However, users can designate with great precision which areas are to be searched and with what priority. The invention takes this to another level by actually moving the particles that represent mobile targets, using a behavioral model.

Plural models may be included, one for each hypothesized identity of the target. The models are updated with a variety of data including, by way of example, the location, identity, current focus of other searchers, prior focus of other searchers, the velocity of other searchers, future movement and success of other searchers. The search may be performed in a physical three-dimensional (3D) space, a virtual data structure or other application.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A search system comprising:
a plurality of sensors for detecting an object of interest;
a predictive model which receives an output from at least one of said plurality of sensors, said predictive model for predicting a behavior of said object using a probability distribution in the form of a set of particles; and
a processor for directing a respective sensor to search a unique area of a search space predicted to include the object by said predictive model.

2. The system of claim 1 wherein the predictive model is adapted to direct at least two sensors using a clustering technique that partitions the particles into one group for each sensor.

3. The system of claim 2 wherein:
the probability distribution of particles which form the set of particles is a cluster; and
each of the at least two sensors is directed to search a respective cluster selected by said predictive model.

4. The system of claim 3 wherein the processor is adapted to direct respective sensors toward a center of mass of said probability distribution of particles.

5. The system of claim 3 wherein said predictive model is adapted to direct each sensor toward a selected one of the particles in the cluster selected by said predictive model.

6. The system of claim 5 wherein each sensor eliminates particles that represent the area of the search space observed by other sensors.

7. The system of claim 5 wherein each of the eliminated particles reappear after a predetermined period of time.

8. The system of claim 5 wherein the predictive model is adapted such that as each sensor obtains more information about an object of interest, the probability distribution of particles related to that object of interest is modified to better represent the new information.

9. The system of claim 1 further including means for receiving updates regarding other sensors.

10. The system of claim 9 further including means for modeling activities of other sensors in time intervals between updates on activities of such other sensors.

11. The system of claim 10 wherein said update includes information regarding current focus of attention of other sensors.

12. The system of claim 11 wherein the current focus of attention is a field of regard of a sensor.

13. The system of claim 1 wherein said behavior is movement in three-dimensional physical space.

14. A system for searching for an object of interest, the system comprising:
a plurality of mobile platforms, each of said plurality of mobile platforms including:
a detector mounted on the mobile platform, said detector for detecting the object of interest; and
a processor, mounted on the mobile platform, said processor having a plurality of hypothesized identities of the object of interest and having a like plurality of predictive models, one predictive model for each of the plurality of hypothesized identities, said processor for predicting a behavior of the object of interest using a predictive model and in response to said processor predicting a behavior of the object of interest, said processor directs the platform to the object of interest and wherein:
the predictive model includes a probability distribution in the form of a set of particles;
the predictive model is adapted to receive updates on an identity of the object of interest; and
the predictive model moves particles within the set of particles to reflect the behavior of the object of interest.

15. The system of claim 14 wherein each of the plurality of predictive models are adapted to receive updates on a location of the object of interest.

16. The system of claim 15 wherein the updates contain probabilistic information about the object of interest.

17. The system of claim 14 wherein said detector on each of said plurality of mobile platforms is directed within a search area.

18. The system of claim 17 wherein at least one of said plurality of mobile platforms is a robot.

19. The system of claim 18 wherein all of said plurality of mobile platforms are provided as robots.

20. A search system comprising:
a plurality of mobile platforms, each of said plurality of mobile platforms comprising;
(a) a detector for detecting an object of interest; and
(b) a processor for predicting a behavior of the object of interest using a predictive model and, in response to behavior predicted by said processor, for directing the mobile platform on which said processor is disposed to search a unique area of a search space including the object of interest and wherein the predictive model includes a probability distribution in the form of a set of particles and wherein the predictive model moves particles within the set of particles to reflect the behavior of the object of interest.

21. The system of claim 20 wherein each mobile platform is a robot and the predictive model is adapted to direct each robot using a clustering technique that partitions the particles into one group for each detector.

22. The system of claim 21 wherein said probability distribution of said particles is a cluster.

23. The system of claim 22 wherein each of said robots is directed to search a respective cluster selected by the predictive model.

24. The system of claim 23 wherein the predictive model in each of said plurality robots is adapted to direct the detector of each robot toward a selected one of the particles in the cluster selected by the predictive model.

25. The system of claim 24 wherein each robot adjusts the predictive model by eliminating particles that represent an area of the search space observed by its detector and the detector of other robots.

26. The system of claim 25 wherein the predictive model is updated after a predetermined period of time by adding back at least some eliminated particles.

27. The system of claim 24 wherein the predictive model is adapted such that as each robot obtains more information about an object of interest, at least one of:
a distribution of particles related to the object of interest is modified to better represent the new information; or
a density of particles related to the object of interest is modified to better represent the new information.

28. The system of claim 20 further comprising:
(c) means for tracking the object of interest using the set of particles.

29. The system of claim 20 further comprising:
(c) means for receiving updates regarding other mobile platforms.

30. The system of claim 29 further including means for modeling activities of other mobile platforms in time intervals between updates on activities of such other mobile platforms.

31. The system of claim 30 wherein said update includes information regarding current focus of attention of other mobile platforms.

32. The system of claim 31 wherein the current focus of attention is a field of regard of the detector of a mobile platform.

33. The system of claim 20 wherein said behavior is movement in three-dimensional physical space.

34. The system of claim 2, wherein the clustering technique is a K-means clustering technique.

35. The system of claim 34, wherein the K-means clustering technique partitions particles into a number of particle clusters equal to the number of sensors and each sensor is assigned to search one of the particle clusters.

36. The system of claim 35, wherein sensor assignments are based upon a distance between sensor location and particle cluster center of mass.

37. The system of claim 35, wherein each of said plurality of sensors is directed toward a waypoint defined by an assigned particle cluster center of mass.

38. The system of claim 35, wherein at least one of said plurality of sensors is further directed to search a subcluster of particles of an assigned particle cluster.

39. The system of claim 20 wherein the predictive model is a first one of a plurality of predictive models with each of the plurality of predictive models corresponding to one of a plurality of hypothesized identifies of the object of interest.

40. The system of claim 20 wherein the predictive model is adapted to receive updates on an identity of the object of interest.

* * * * *